(12) United States Patent
Takishima et al.

(10) Patent No.: US 7,990,814 B2
(45) Date of Patent: Aug. 2, 2011

(54) OPTICAL DISK DRIVE

(75) Inventors: Suguru Takishima, Tokyo (JP); Hiroshi Nishikawa, Saitama (JP); Hiroshi Kanazawa, Saitama (JP); Ryosei Honma, Tokyo (JP)

(73) Assignee: Hoya Corporation, Tokyo (JP)

( * ) Notice: Subject to any disclaimer, the term of this patent is extended or adjusted under 35 U.S.C. 154(b) by 894 days.

(21) Appl. No.: 11/763,515

(22) Filed: Jun. 15, 2007

(65) Prior Publication Data
US 2007/0291618 A1 Dec. 20, 2007

(30) Foreign Application Priority Data
Jun. 16, 2006 (JP) ................................ 2006-167245

(51) Int. Cl.
*G11B 7/00* (2006.01)
(52) U.S. Cl. ............... 369/44.23; 369/44.14; 369/44.24; 369/112.01; 369/112.08
(58) Field of Classification Search ............... 369/13.13, 369/44.32, 112.01, 44.23, 112.08, 112.23, 369/112.24, 44.14, 44.24, 94; 720/663
See application file for complete search history.

(56) References Cited

U.S. PATENT DOCUMENTS

| | | | | |
|---|---|---|---|---|
| 5,107,477 A * | 4/1992 | Fujita et al. | ................. | 369/44.24 |
| 6,324,141 B2 | 11/2001 | Takishima et al. | | |
| 6,418,108 B1 * | 7/2002 | Ueda et al. | ................. | 369/112.23 |
| 6,430,113 B1 | 8/2002 | Takishima | | |
| 6,542,315 B2 | 4/2003 | Shindo | | |
| 6,625,099 B2 * | 9/2003 | Nakano | ................. | 369/94 |
| 6,791,763 B2 | 9/2004 | Hattori et al. | | |
| 6,977,870 B2 * | 12/2005 | Fujimaki et al. | ................. | 369/13.13 |
| 2003/0161249 A1 * | 8/2003 | Kamisada et al. | ................. | 369/112.23 |
| 2004/0037204 A1 * | 2/2004 | Takeuchi | ................. | 369/112.08 |
| 2005/0002289 A1 * | 1/2005 | Mori | ................. | 369/44.23 |
| 2005/0083823 A1 * | 4/2005 | Miyata et al. | ................. | 369/112.01 |
| 2005/0270955 A1 * | 12/2005 | Hirai | ................. | 369/112.01 |
| 2007/0014210 A1 * | 1/2007 | Nishioka | ................. | 369/44.32 |

FOREIGN PATENT DOCUMENTS

| | | |
|---|---|---|
| JP | 59-101038 | 6/1984 |
| JP | 62-83225 | 5/1987 |
| JP | 2-044535 | 2/1990 |
| JP | 3-189932 | 8/1991 |
| JP | 10-177735 | 6/1998 |
| JP | 2002-117566 | 4/2002 |
| JP | 2002-243915 | 8/2002 |
| JP | 2004171682 A * | 6/2004 |

OTHER PUBLICATIONS

English language Abstract of JP 10-177735.

* cited by examiner

*Primary Examiner* — Thuy N Pardo
(74) *Attorney, Agent, or Firm* — Greenblum & Bernstein, P.L.C.

(57) ABSTRACT

An optical disk drive for recording information on a recording surface of an optical disk and reading information recorded in the optical disk is provided. The optical disk drive includes a spindle to rotate the optical disk and a carriage movable in parallel with a tracking direction of the optical disk. The carriage includes a laser light source to emit laser light, a collimator lens to convert divergent light into parallel light and is arranged with an optical center thereof being in a farther and offset position with respect to an optical axis of the laser light, a reflecting mirror to receive and deflect the laser light transmitted through the collimator lens in a direction perpendicular to the recording surface of the optical disk, and an objective lens to converge the laser light deflected by the reflecting mirror on a position corresponding to the recording surface of the optical disk.

6 Claims, 6 Drawing Sheets

OPTICAL DISK DRIVE

BACKGROUND OF THE INVENTION

The present invention relates to an optical disk drive, which is capable of converging laser beam on a recording surface of an optical disk so that information can be written on and read from the recording surface.

Generally, an optical pickup used in an optical disk drive, which records optical information in an optical disk as a recording medium such as a CD (compact disk) and a DVD (digital versatile disk) and reads such optical information from the optical disk, is configured to converge laser beam emitted from a semiconductor laser on a recording surface of the optical disk. Specifically, the laser beam emitted from the semiconductor laser is deflected perpendicularly by a vertical reflection mirror toward the optical disk. The vertical reflection mirror is mounted on a carriage which is movable in a direction to track the optical disk. The deflected laser beam is then converged on the recording surface of the optical disk by an objective optical system. It is noted that the semiconductor laser may be mounted on the carriage, although it may be mounted in a fixture along with a collimator lens which converts the laser beam into parallel light so that the parallel light is emitted in parallel with the tracking direction of the optical disk toward the vertical reflection mirror. It is further noted, however, it has become a mainstream design to configure the optical pick up without a collimator lens and an objective lens to be a finite optical system while the entire optical components of the optical pickup are mounted on the carriage so that the entire optical disk drive can be downsized.

Figure 6:
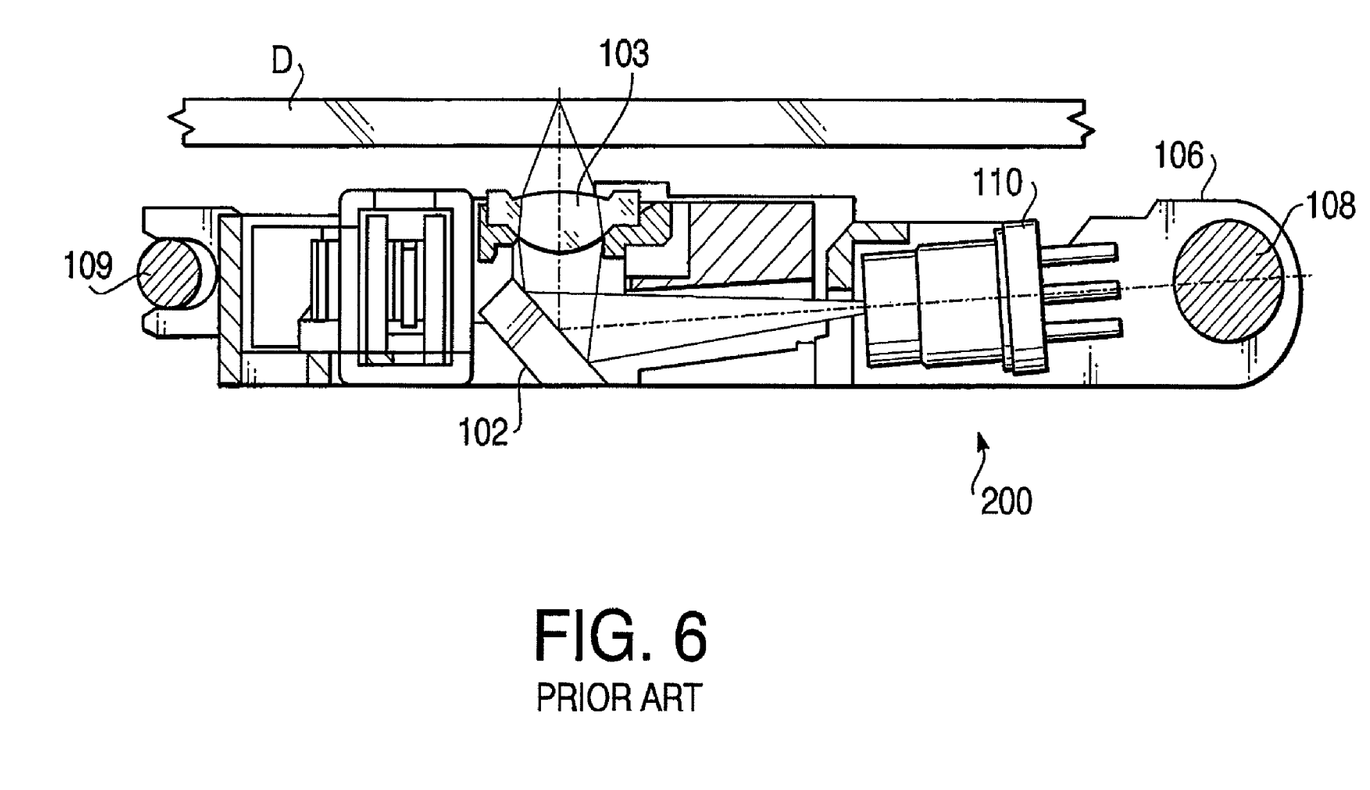
FIG. 6 is a cross-sectional side view of a carriage in a conventional optical pickup drive.

An example of such an optical pickup being entirely mounted on a carriage is disclosed in Japanese Patent Provisional Publication No. HEI10-177735. FIG. 6 shows a cross-sectional view of a configuration of the optical pickup in an optical disk drive 200 which is entirely mounted on the carriage 106 taken from a plane being perpendicular to a direction of the carriage 106 to be moved. In FIG. 6, the carriage 106 is slidably supported by a pair of slide rails 108, 109 which are arranged parallel to an optical disk D and fixed to a fixture (not shown) of the optical disk drive 200 while the optical disk D is clamped to a spindle (not shown). More specifically, the carriage 106 is configured to be slidable only in a direction parallel to a tracking direction of the optical disk D so that a center of an objective lens 103 travels only in the tracking direction of the optical disk D.

The objective lens 103 is arranged on the carriage 106 to face the optical disk D through an opening provided on an upper surface of the carriage 106 with an optical axis thereof being oriented to be perpendicular to the optical disk D. On a side of the objective lens 103 on the carriage 106, a semiconductor laser 110 to emit laser beam, which is to be converged on a recording surface of the optical disk D by the objective lens, is arranged. Further, a vertical reflection mirror 102 is provided so that an axis of the laser beam emitted from the semiconductor laser 110 is deflected in a direction coinciding with the optical axis of the objective lens 103, and the deflected laser beam enters the objective lens 103.

With the above configuration, if the vertical reflection mirror 102 is arranged in an orientation wherein the laser beam is emitted from the semiconductor laser 110 in parallel with the optical disk D to enter the vertical reflection mirror 102 (similarly to a configuration of the optical pickup wherein a semiconductor laser as well as a collimator lens are mounted on a fixture), the vertical reflection mirror 102 can be configured to be inclined at 45 degrees with respect to the optical disk D in order to simply deflect the laser beam at 90 degrees. However, as shown in FIG. 6, an outer diameter of a package of the semiconductor laser 110 is generally considerably greater than a diameter of a beam spot of the laser beam entering the vertical reflection mirror 102. Therefore, in order to arrange the semiconductor laser 110 to emit the laser beam being parallel with the optical disk D at a center of the vertical reflection mirror 102, the package of the semiconductor laser 110 is required to partially protrude downward below a lower edge of the vertical reflection mirror 102. In the optical disk drive 200 shown in FIG. 6, in order to avoid the package of the semiconductor laser 110 from protruding, the semiconductor laser 110 is inclined with respect to the optical disk D so that the semiconductor laser 110 can be located closer to the optical disk D, and thus the entire height of the carriage 106 can be reduced.

In the configuration disclosed in the above-referenced publication, however, an inclination angle of the semiconductor laser 110 is limited, thus an inclination of the beam emitting from the semiconductor laser to the vertical reflection mirror 102 is also limited. Particularly, when a distance between the semiconductor laser 110 and the vertical reflection mirror 102 is longer, the semiconductor laser 110 can be located closer to the optical disk D even if the package of the semiconductor laser 110 is inclined at a smaller angle. As a result, an inclination angle between the vertical reflection mirror 102 and the optical disk D cannot be configured to be considerably smaller than 45 degrees. Therefore, an area to be occupied by the vertical reflection mirror 102 taken from a direction perpendicular to the optical disk D remains greater, and the height of the carriage 106 is not considerably reduced. Further, when the optical lens 103 is configured to be a finite optical system wherein divergent light is entered, the optical property of the beam may be deteriorated as the objective lens 103 is moved for focusing.

SUMMARY OF THE INVENTION

In view of the foregoing drawbacks, the present invention is advantageous in that an optical disk drive having a carriage with a smaller configuration in its height is provided. In the carriage, an area to be occupied by a vertical reflection mirror taken from a direction perpendicular to an optical disk can be configured to be smaller by inclining a path of laser beam to enter the vertical reflection mirror at a larger angle. Further, an objective lens of the optical disk drive is configured to be an infinite system so that optical property of the laser beam that may otherwise be deteriorated can be maintained while a number of additional components to be used in the optical disk drive is minimized.

According to an aspect of the present invention, there is provided an optical disk drive for recording information on a recording surface of an optical disk as a recording medium and reading information recorded in the optical disk. The optical disk drive includes a spindle, which is adapted to rotate the optical disk placed in the optical disk drive, and a carriage, which is adapted to be movable in parallel with a tracking direction of the optical disk. The carriage includes a laser light source, which emits laser light in a direction parallel with the recording surface of the optical disk, a collimator lens, which converts divergent light into parallel light and is arranged with an optical center thereof being in a farther and offset position with respect to an optical axis of the laser light emitted from the laser light source so that the laser light emitted from the laser light source is converted into parallel light and deflected in a direction to be farther from the optical disk, a reflecting mirror, which receives and deflects the laser light transmitted through the collimator lens in a direction perpendicular to the recording surface of the optical disk, and an objective lens, which converges the laser light deflected by the reflecting mirror on a position corresponding to the recording surface of the optical disk placed in the optical disk drive.

Optionally, the collimator lens may be supported in an inclined position wherein the optical axis of the laser light transmitted therethrough is led farther from the optical disk.

Optionally, the collimator lens may be arranged in a position wherein the optical axis thereof coincides with an emitting point of the laser light in the laser light source.

Optionally, the collimator lens may include a transmitting portion through which the laser light emitted from the laser light source transmits and a remaining portion through which no laser light transmits. The collimator lens may be formed to have a shape eliminating a part of the remaining portion.

According to another aspect of the present invention, there is provided an optical pick up unit for an optical disk drive to record information on a recording surface of an optical disk as a recording medium and read information recorded in the optical disk. The optical pickup unit includes a laser light source, which emits laser light in a direction parallel with the recording surface of the optical disk, a collimator lens, which converts divergent light into parallel light and is arranged with an optical center thereof being in a farther and offset position with respect to an optical axis of the laser light emitted from the laser light source so that the laser light emitted from the laser light source is converted into parallel light and deflected in a direction to be farther from the optical disk, a reflecting mirror, which receives and deflects the laser light transmitted through the collimator lens in a direction perpendicular to the recording surface of the optical disk, and an objective lens, which converges the laser light deflected by the reflecting mirror on a position corresponding to the recording surface of the optical disk. The optical pickup unit is included in a carriage of the optical disk drive which is movable in parallel with a tracking direction of the optical disk.

DETAILED DESCRIPTION OF THE EMBODIMENTS

Hereinafter, referring to the accompanying drawings, according to illustrative embodiments of the invention will be described.

Figure 1:
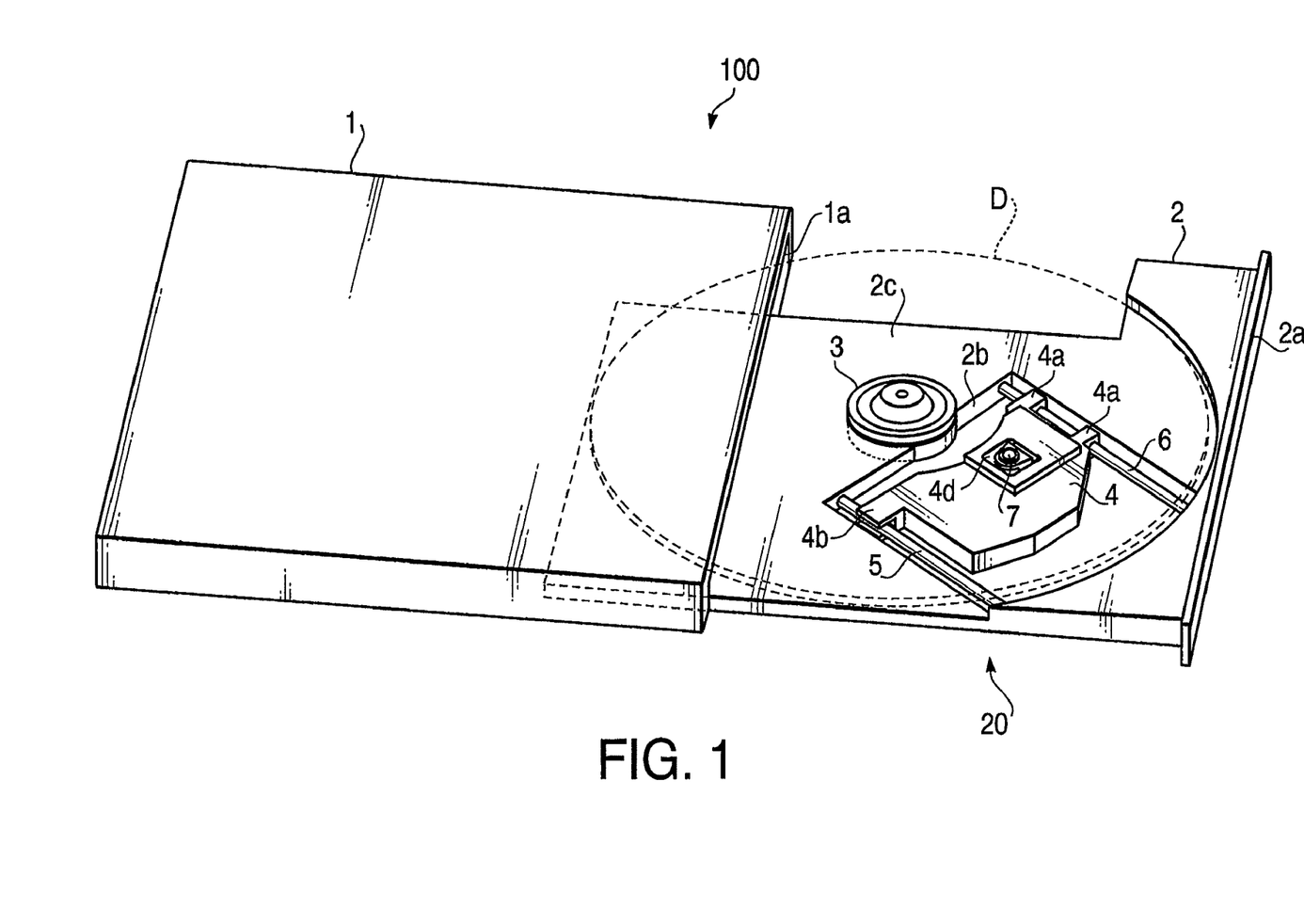
FIG. 1 is an overall perspective view showing an optical disk drive for optical pickup according to an embodiment of the present invention.

FIG. 1 is a perspective view showing a structure of an optical disk drive 100 having an optical pickup unit 20 according to the embodiment of the present invention. As shown in FIG. 1, the optical disk drive 100 according to the present invention includes a casing 1 having a thin boxed-shape to be incorporated in a chassis of a personal computer (not shown), and a tray 2 capable of being inserted in and ejected from the casing 1 through a slit 1a provided on one side of the casing 1. An optical disk D can be placed on and removed from the tray 2 as the tray 2 is ejected from the casing 1. As the tray 2 is inserted in the casing 1, the optical disk D is held in the casing 1, and the slit 1a of the casing 1 is closed by a cover surface 2a of the tray 2.

Additionally, in the present embodiment, a spindle 3 and a carriage 4, which serve mainly for essential functions of the optical disk drive 100, are incorporated in the tray 2, in order to reduce a thickness of the optical disk drive 100. Incidentally, the present invention may also be applied to a thin type optical disk drive used in a laptop computer, in which a spindle and a carriage are incorporated in the casing, and a top of the casing can be opened and closed by a cover.

As shown in FIG. 1, in the optical disk drive 100, a disk loading portion 2c is formed on an upper surface of the tray 2. The disk loading portion 2c is a substantially circularly recessed portion, of which diameter is substantially larger than a diameter of the optical disk D, along an outer edge of the optical disk D so that the optical disk D can be loaded thereon and rotated therein. The spindle 3 is mounted at a substantial center of the disk loading portion 2c. A head of the spindle 3 is inserted in a hole (not shown) formed in the optical disk D, and the optical disk D is clamped by the hole with a shaft (not shown), which is rotated by a direct drive motor (not shown) incorporated in the spindle 3. Thus, the optical disk D is rotated about a center being coincident with the spindle 3.

The carriage 4 is slidably held by two rails 5, 6, which are parallel to each other and provided in a cutout 2b, to be slid in the cutout 2b. The cutout 2b is an approximately rectangular opening formed on a bottom surface of the disk loading portion 2c, with two sides being parallel to a radial of a circular shape of the disk loading portion 2c. The rails 5, 6 are extended within the cutout 2b in parallel with a movement locus of an objective lens (which is described later), which is in parallel with the radial of the circle having the center coincident with the spindle 3.

The rail 6 penetrates a pair of guide followers 4a protruded from one edge of the carriage 4, while the rail 5 is slidably supported by a fork 4b protruded from the other edge of the carriage 4. Therefore, the carriage 4 can be slid in the cutout 2b so that the objective lens can move in the radial direction of the circle coincident with the spindle 3 (i.e. in a tracking direction of the optical disk D).

Incidentally, a rack (not shown) is formed in an edge of each guide follower 4a, and a worm gear (not shown) to be engaged with the rack is incorporated in parallel with the rail 6 at an inside surface of the cutout 2b. Thus, a position of the carriage 4 is controlled by the worm gear being rotated by a motor (not shown).

Figure 2:
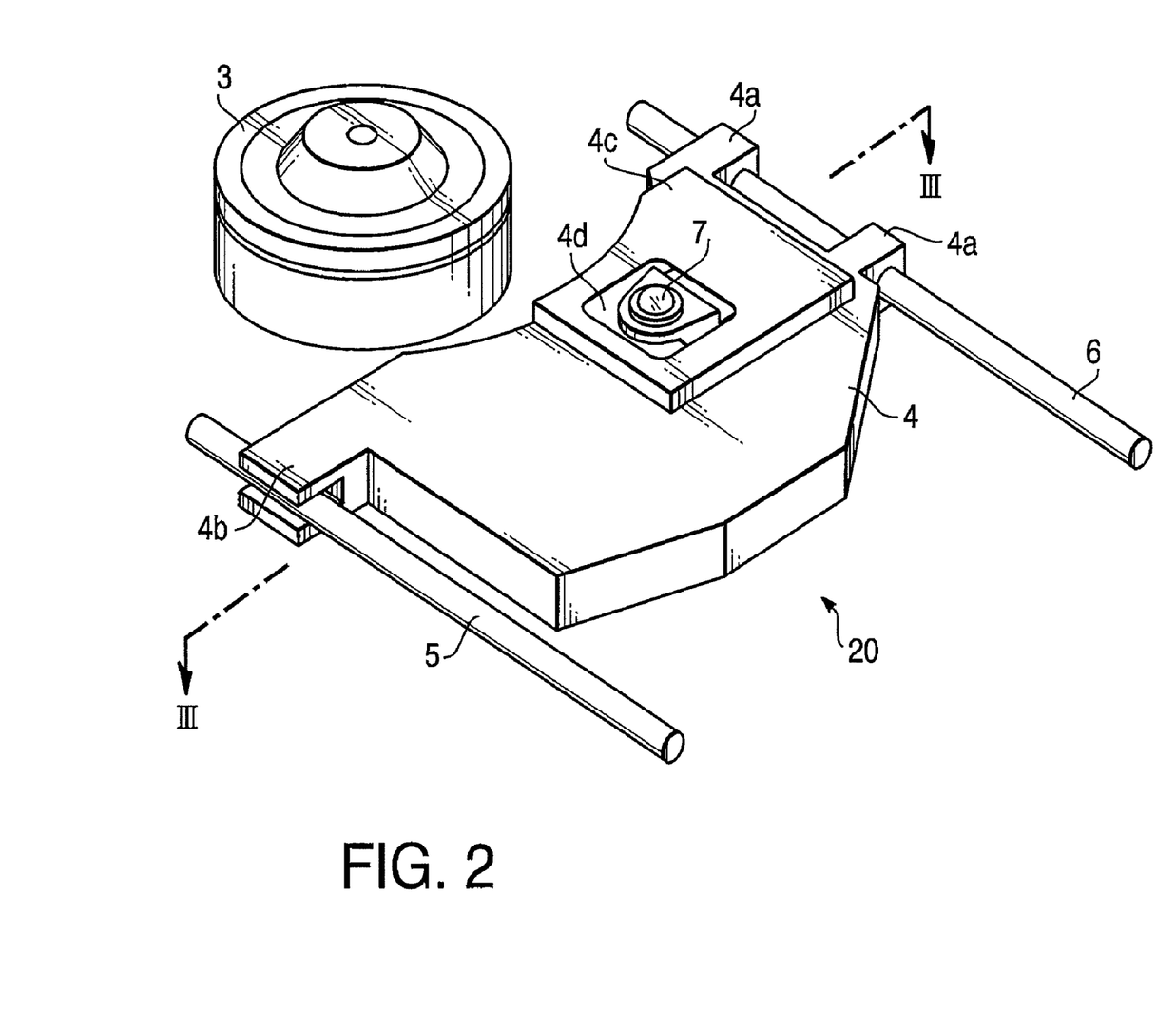
FIG. 2 is a partially enlarged view of a structure of an optical pickup unit 20 including a spindle and a carriage shown in FIG. 1 according to the embodiment of the present invention.

FIG. 2 is a partially enlarged view of a structure of an optical pickup unit 20 including a spindle and a carriage shown in FIG. 1 according to the embodiment of the present invention. As shown in FIG. 2, the carriage 4 is formed to be a flat inequilateral shaped plate having six sides. The carriage 4 has a protrusive portion 4c on a top surface thereof, in order to prevent the optical disk D from interfering with a surface of the objective lens. Additionally, the protrusive portion 4c has a window 4d from which the objective lens 7 is exposed.

Figure 3:
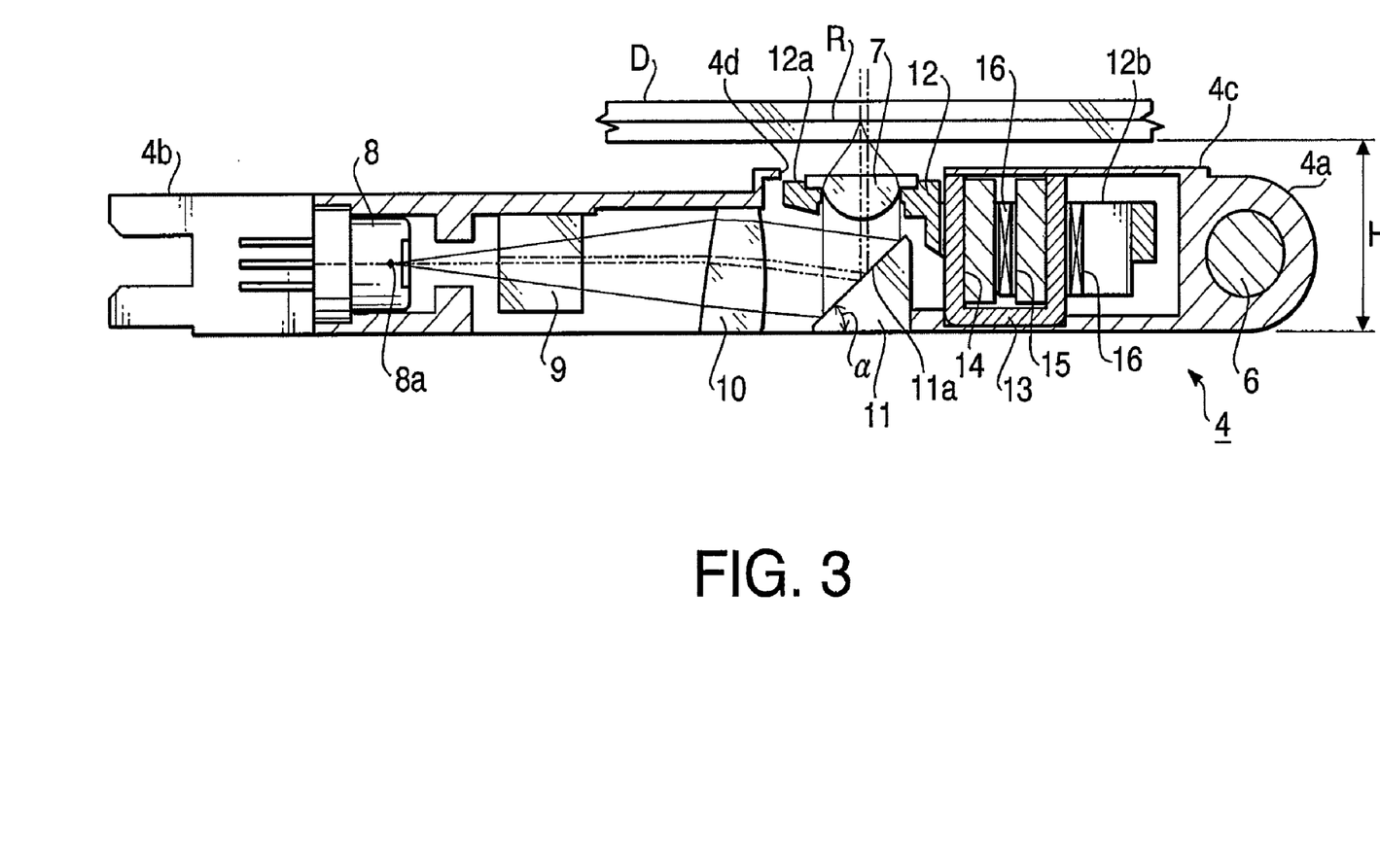
FIG. 3 is a cross-sectional side view of the carriage taken from III-III in FIG. 2 according to the embodiment of the present invention.

FIG. 3 is a cross-sectional side view of the carriage taken from III-III in FIG. 2 according to the embodiment of the present invention. The carriage 4, including the protrusive portion 4c, is formed to be hollow inside, and as shown in FIG. 3, each optical component and mechanical component configuring the optical pickup unit 20 are arranged therein. It should be noted that hereinafter, the "carriage 4" refers to an outer frame of the optical pickup unit 20 excluding the optical components incorporated therein.

The optical components incorporated in the optical pickup unit 20 include a semiconductor laser 8, a beam splitter 9, a collimator lens 10, a reflecting mirror 11, the objective lens 7, and other various optical elements and sensors for signal detecting (such as a sensor to detect a signal recorded in the optical disk D based on the intensity of reflection from the optical disk D and changes of deflection, and a sensor to detect a signal for controlling the objective lens 7 based on an extent of blurriness, etc.)

The semiconductor laser 8 as a source of laser light, is fixed in the carriage 4 adjacent to the fork 4b in the carriage 4, and the laser beam therefrom is emitted toward space directly below the window 4d in parallel with the optical disk D. The semiconductor laser 8 is supplied a driving current through a flexible printed circuit (not shown).

The beam splitter 9 is a composite prism arranged on a light path of the laser beam emitted as divergent light from the semiconductor laser 8. The beam splitter 9 transmits the laser beam therethrough to lead the laser beam through the collimator lens 10, the reflecting mirror 11, the objective lens 7, and the optical disk D (as indicated in a dashed-dotted line in FIG. 3) and into various optical elements and sensors (not shown) for signal detecting and to receive the reflection from the optical disk D (as indicated in a dashed-two-dotted line in FIG. 3) to reflect the same in a direction perpendicular to a plane of FIG. 3. It is noted that the dashed-dotted line and the dashed-two-dotted line are indicated separately in FIG. 3 for better understanding, however, the dashed-two-dotted line is substantially coincident with a part of the dashed-dotted line.

Figure 4:
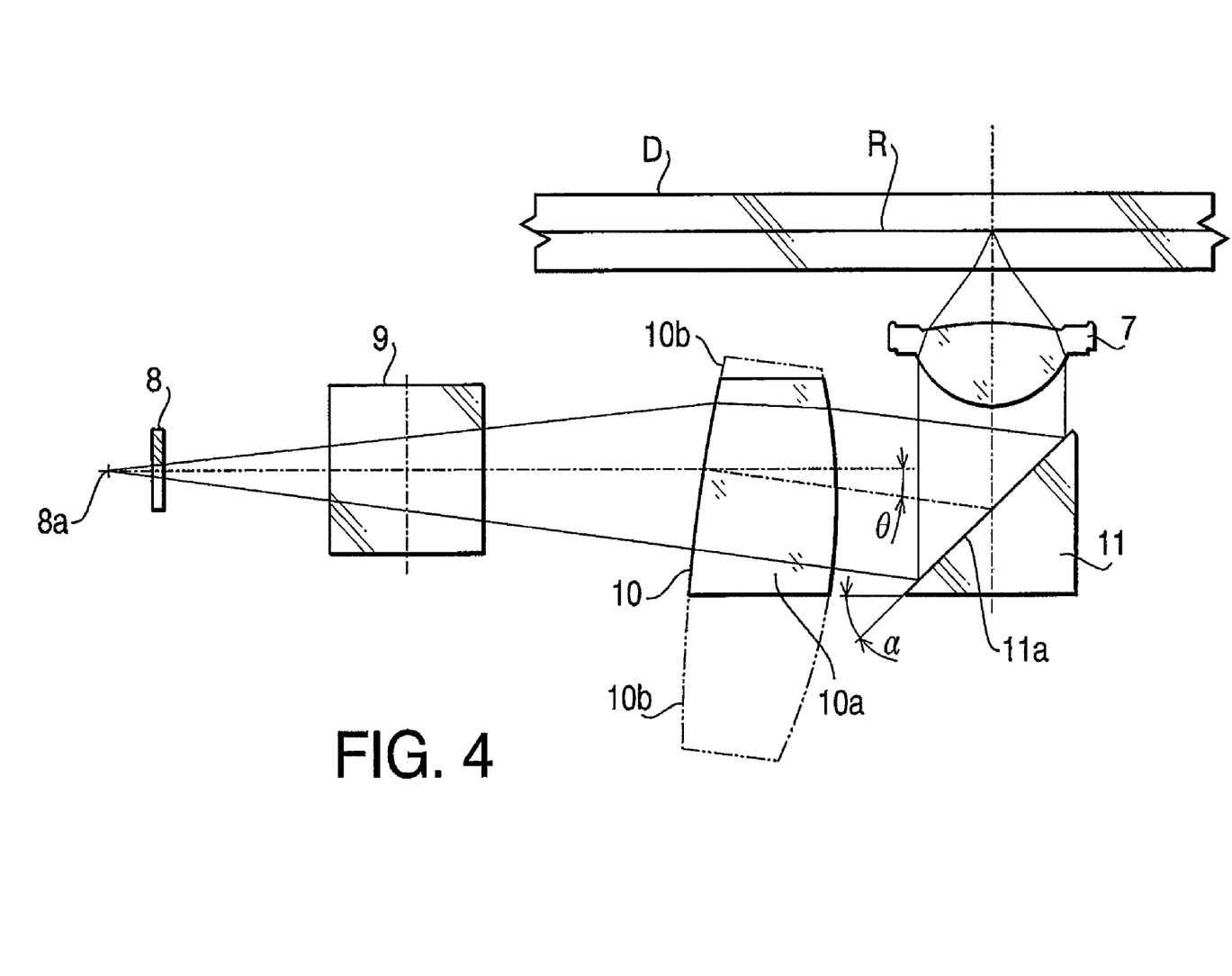
FIG. 4 is a schematic diagram showing an arrangement of a collimator lens in the optical disk drive according to the embodiment of the present invention.

The collimator lens 10 is a positive lens configured to convert the laser beam, which is divergent light emitted from the semiconductor laser 8 and transmitted by the beam splitter 9, into parallel light, and to deflect the parallel light in a direction wherein an axis of the parallel light is led away from the optical disk D. In order to modify the characteristics of the laser beam, the collimator lens 10 is placed in a position such that the center of the collimator lens 10 is offset with respect to an optical axis of the laser beam and is lower than the optical axis of the laser beam. Specifically, the collimator lens 10 is inclined at an angle and arranged in a position such that a front focal thereof coincides with an emitting point 8a of the semiconductor laser 8, and the optical axis of the emitted laser beam is led away from the optical disk D as the laser beam transmits to the collimator lens 10.

The collimator lens 10 includes a transmitting portion 10a wherein the laser beam transmits therethrough and remaining portions 10b wherein the laser beam does not transmit, and the collimator lens 10 has a shape that eliminates a part of the remaining portions 10b. It is noted that the remaining portions 10b do not essentially affect the characteristics of the laser beam even if they are eliminated. Therefore, the laser beam transmitted though the collimator lens 10 is normally converted into parallel light, which is in parallel with the optical axis (i.e. directed away from the optical disk D as it proceeds). Incidentally, the inclined angle of the optical axis of the collimator lens 10 with respect to the beam axis of the laser beam (i.e. inclined angle with respect to the optical disk D) can be configured in a range from 0 degree to 10 degrees, more preferably, from 7 degrees to 8 degrees.

The reflecting mirror 11 is arranged on the light path of the laser beam being parallel light so that a bottom surface of the reflecting mirror 11 coincides with a bottom surface of the carriage 4. The reflecting mirror 11 has a reflecting surface 11a which is inclined and faced with the collimator lens 10. The reflecting mirror 11 deflects the laser beam being parallel light admitted the reflecting surface 11a in a direction perpendicular to the optical disk D toward the optical disk D. Therefore, the inclined angle α of the reflecting surface 11a of the reflecting mirror 11 with respect to the optical disk D (i.e. the inclined angle with respect to the bottom surface of the carriage 4) is smaller than 45 degrees.

The objective lens 7 is a collective lens (a positive lens) configured to collect the laser beam (parallel light) reflected by the reflecting mirror 11 on a recording layer R of the optical disk D. Incidentally, the laser beam collected on the recording layer R is reflected as divergent light being modified by the recording layer R based on the information recorded. Then, the laser beam 8 as the reflected divergent light is converted into parallel light, when the objective lens 7 focuses correctly, reflected by the reflection mirror 11, converged by the collimator lens 10, and admitted to the beam splitter 9. Thereafter, the laser beam is reflected by the beam splitter 9 in the direction perpendicular to the plane of FIG. 3 and detected by the various sensors, as described above. Incidentally, when the objective lens 7 does not focus the divergent light from the recording layer R correctly, the laser beam reflected by the beam splitter 9 is not correctly focused on a standard position and focused on a displaced position. Thus, the sensor detects a direction and an amount of the displacement so that the position of the objective lens 7 is corrected by a fine actuator mechanism supporting the objective lens 7 based on the detected direction and amount of displacement.

The fine actuator mechanism includes a lens frame 12, a plurality of supporting wires (not shown), a magnetic core 13, a pair of permanent magnets 14, 15, and a coil 16. The lens frame 12 is formed to have a lens barrel 12a and a frame portion 12b. The lens barrel 12a is formed in one end of the lens frame 12, and the objective lens 7 is incorporated therein. The frame portion 12b is formed in the other end of the lens frame 12 and provided with an opening that penetrates through the lens frame 12 in a direction perpendicular to the optical disk D. The plurality of supporting wires support the lens frame 12 in the carriage 4 so that the lens frame 12 can be moved only in a direction perpendicular to the optical disk D. The magnetic core 13 is formed to have a cross-sectional shape of an approximate U, of which bottom portion is fixed on the bottom surface of the carriage 4, penetrating the frame portion 12b of lens frame 12. The pair of permanent magnets 14, 15 are fixed onto inside surfaces of the magnetic core 13 and are arranged to oppose to each other. A south pole of one of the permanent magnets 14, 15 is faced to a north pole of the other. The coil 16 is coiled around the permanent magnet 15 and one edge of the magnetic core 13 to encircle them (but to be movable with respect to the permanent coil 15 and magnetic core 13) and fixed onto the inside surfaces of the frame 12b.

When the current is applied to the coil 16, the electromagnetic power oriented in one of two directions (i.e., a direction toward the optical disk D and a direction to be away from the optical disk D) depending on the direction of the current, is generated in the coil 16, which causes the lens frame 12 with the objective lens 7 to move in a vertical direction (i.e. close to or apart from) with respect to the optical disk D.

Figure 5:
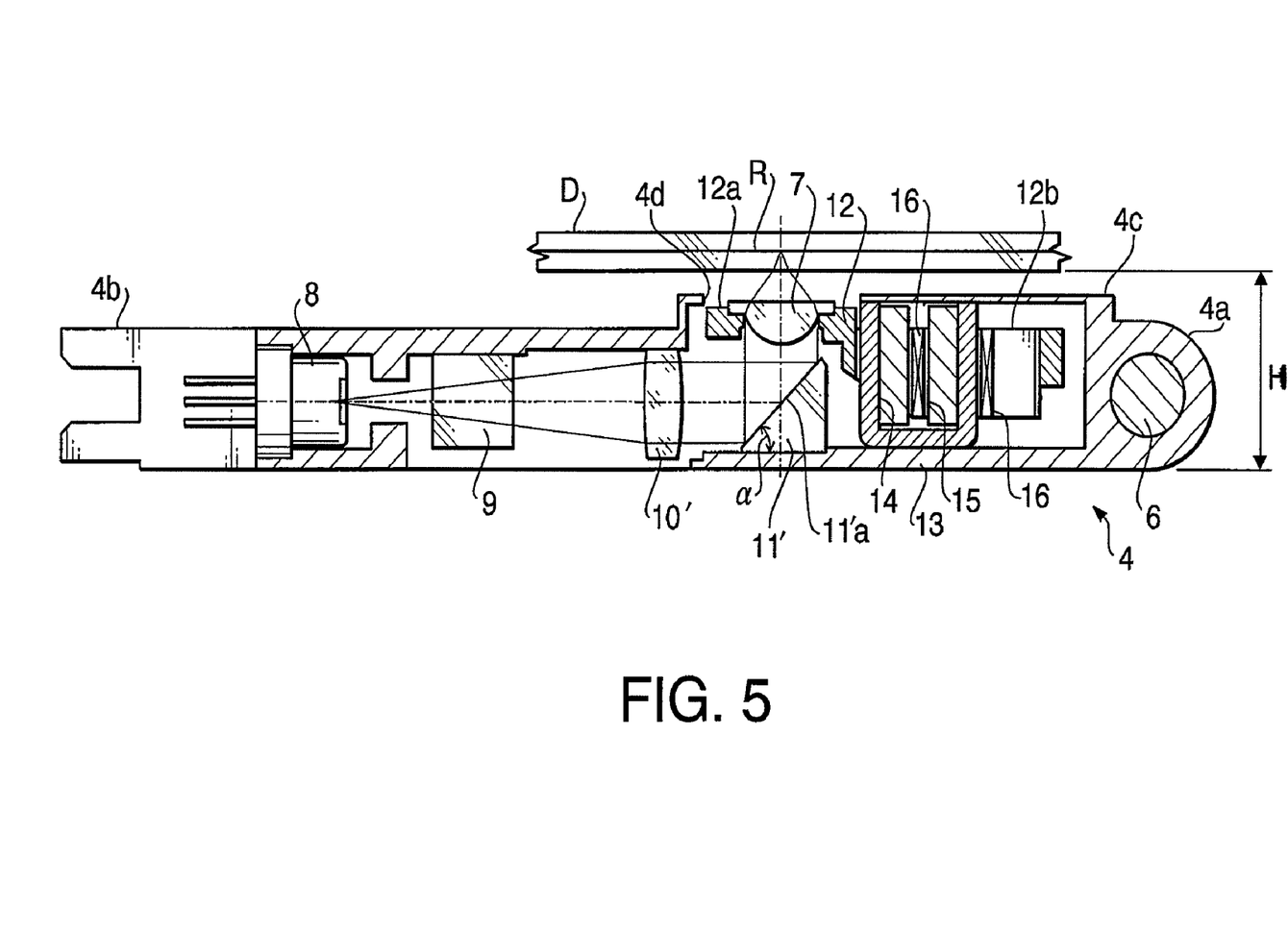
FIG. 5 is a cross-sectional side view of a carriage in an optical pickup drive as a comparative example.

As described above, the optical disk drive 100 according to the present embodiment is configured as an infinite conjugate optics system as well as a comparative example shown in FIG.

5, of which configuration is not necessarily considered to be prior art. However, in the comparative example as shown in FIG. 5, the laser beam emitted from the semiconductor laser 8 is directed in parallel with the optical disk D, and a collimator lens 10 in a conventional shape is used to convert the laser beam into the parallel light. Further, a reflecting surface 11'a of a reflecting mirror 11' is inclined at 45 degrees with respect to the optical disk D. In the present embodiment, on the other hand, the semiconductor laser 8 can be arranged in a position closer to the optical disk D (i.e., L'<L). Further, the inclination angle of the reflecting surface 11a of the reflecting mirror 11 can be configured to be smaller than 45 degrees so that an area to be occupied by the reflecting mirror 11 taken from the direction perpendicular to the optical disk D can be configured to be smaller.

Further, in comparison with the conventional configuration of an optical disk drive 200 shown in FIG. 6, which is a finite conjugate optics system having the inclined laser beam emitted from the semiconductor laser 110, less deterioration of the optical performance concerning focusing in the optical disk drive 200 is caused according to the present embodiment.

Incidentally, when the optical disk drive 200 is configured to be an infinite conjugate optics system by including a collimator lens arranged between the semiconductor laser 110 and the reflection mirror 102, a distance between the semiconductor laser 110 and the reflection mirror 102 are required to be longer, in order to arrange the collimator lens and other optical elements (such as a beam shaping prism). Therefore, the inclined angle of the reflection mirror 102 cannot be considerably smaller than 45 degrees, even if the semiconductor laser 110 is inclined to be closer a position of the semiconductor laser 110 with respect to the optical disk D. Consequently, it has a rather minor effect to reduce the thickness of the reflection mirror 102 in a direction perpendicular to the optical disk D.

On the other hand, in the present embodiment, the laser beam admitted to the reflection mirror 11 can be substantially inclined since the direction of the laser beam is deflected by the collimator lens 10 arranged in front of the reflection mirror 11. Therefore, the inclined angle of the reflection mirror 11 can be considerably smaller than 45 degrees, and the thickness of the reflection mirror 11 in the direction perpendicular to the optical disk D can be reduced considerably.

Although examples of carrying out the invention have been described above, the present invention is not limited to the above described embodiment.

The present disclosure relates to the subject matter contained in Japanese Patent Application No. P2006-167245, filed on Jun. 16, 2006, which is expressly incorporated herein by reference in its entirety.

What is claimed is:

1. An optical disk drive for recording information on a recording surface of an optical disk as a recording medium and reading information recorded in the optical disk, comprising:
    a spindle, which is adapted to rotate the optical disk when placed in the optical disk drive; and
    a carriage, which is adapted to be movable in parallel with a tracking direction of the optical disk, wherein the carriage includes:
    a laser light source, which emits laser light in a direction parallel with the recording surface of the optical disk;
    a collimator lens, which converts divergent light into parallel light and is arranged with an optical center thereof being in an offset position with respect to an optical axis of the laser light emitted from the laser light source so that the laser light emitted from the laser light source is converted into parallel light and deflected in a direction away from the optical disk;
    a reflecting mirror, which receives and deflects the laser light transmitted through the collimator lens in a direction perpendicular to the recording surface of the optical disk; and
    an objective lens, which converges the laser light deflected by the reflecting mirror on a position corresponding to the recording surface of the optical disk placed in the optical disk drive,
    wherein the collimator lens is supported in an inclined position wherein the optical axis of the laser light transmitted therethrough is led away from the optical disk.

2. The optical disk drive according to claim 1, wherein the collimator lens is arranged in a position wherein the optical axis thereof coincides with an emitting point of the laser light in the laser light source.

3. The optical disk drive according to claim 1, wherein the collimator lens includes a transmitting portion through which the laser light emitted from the laser light source transmits and a remaining portion through which no laser light transmits, and wherein the collimator lens is formed to have a shape eliminating a part of the remaining portion.

4. An optical pick up unit for an optical disk drive to record information on a recording surface of an optical disk as a recording medium and read information recorded in the optical disk, comprising:
    a laser light source, which emits laser light in a direction parallel with the recording surface of the optical disk;
    a collimator lens, which converts divergent light into parallel light and is arranged with an optical center thereof being in an offset position with respect to an optical axis of the laser light emitted from the laser light source so that the laser light emitted from the laser light source is converted into parallel light and deflected in a direction away from the optical disk;
    a reflecting mirror, which receives and deflects the laser light transmitted through the collimator lens in a direction perpendicular to the recording surface of the optical disk; and
    an objective lens, which converges the laser light deflected by the reflecting mirror on a position corresponding to the recording surface of the optical disk,
    wherein the optical pickup unit is included in a carriage of the optical disk drive which is movable in parallel with a tracking direction of the optical disk,
    and the collimator lens is supported in an inclined position wherein the optical axis of the laser light transmitted therethrough is led away from the optical disk.

5. The optical disk drive according to claim 1, wherein the collimator lens is positioned between the laser light source and the reflecting mirror.

6. The optical pick up unit according to claim 4, wherein the collimator lens is positioned between the laser light source and the reflecting mirror.

* * * * *